June 7, 1955 P. B. SYLVAN 2,709,921
GYROSCOPIC MOTION SENSING APPARATUS

Filed May 15, 1951 3 Sheets-Sheet 3

INVENTOR
Bengt Sylvan

BY

ATTORNEY

United States Patent Office 2,709,921
Patented June 7, 1955

2,709,921

GYROSCOPIC MOTION SENSING APPARATUS

Per Bengt Sylvan, Linkoping, Sweden, assignor to Svenska Aeroplan Aktiebolaget, Linkoping, Sweden, a joint-stock company of Sweden Application May 15, 1951, Serial No. 226,440

9 Claims. (Cl. 74—5.6)

This invention relates to gyroscopic apparatus for sensing the state of motion of a vehicle such as an aircraft, a marine vessel, or the like, and for producing an output corresponding to the type of motion sensed by the apparatus, which output is of such a nature that it may be impressed upon a control mechanism to thus be utilized to correct, alter or maintain the state of motion of the vehicle.

More particularly the invention relates to gyroscopic apparatus adapted to be installed in a vehicle for producing an output corresponding essentially to a function of the angular displacement of the vehicle about a reference axis plus a function of the rate of such displacement. The obtention of an output corresponding to the sum of these functions is especially valuable for the automatic control of aircraft and guided missiles, since a control device responsive to such an output will effect more rapid correction of deviations of the vehicle from a predetermined course, with less tendency toward hunting or oscillation, than would be the case if the control device were responsive to an output corresponding only to a function of angular displacement or of rate of angular displacement. Heretofore where an output corresponding to the sum of these functions has been impressed upon devices for the control of vehicles such as aircraft and guided missiles the instrumentation for obtaining such an output has comprised a gimbal mounted gyro for sensing angular displacement of the vehicle from a predetermined disposition and a gyro of the "rate of turn" type, which was biased toward a predetermined disposition with respect to the coordinate axes of the vehicle. The outputs of these two gyros had to be combined by means of a third instrumentality, which in turn produced an output that was imposed upon the control device. Thus two gyros had to be employed for each of the vehicle reference axes about which motion had to be sensed for control purposes.

By contrast, it is an object of this invention to provide a sensing instrumentality for producing an output corresponding to a sum of a function of angular displacement about a reference axis and a function of rate of such displacement, which instrumentality employs only a single gyro.

Another object of this invention resides in the provision of a sensing instrumentality of the character described whereby linear acceleration and velocity transversely to the reference axis can also be sensed, and wherein the output of the instrumentality may be directly modified in accordance with desired functions of such acceleration and velocity.

Still another object of this invention resides in the provision of a gyroscopic sensing instrumentality of the character described, which instrumentality may have its output readily modified by the imposition upon it of outputs from other instrumentalities to thereby modify the output of the gyroscopic instrumentality in a manner to bring about a desired deviation from a state of motion normally maintained by the gyroscopic instrumentality.

By attaining this important objective the gyroscopic instrumentality of this invention is capable of serving as a mechanism for combining outputs from several sensing instrumentalities into a single output which may be imposed directly upon mechanism by which controls are actuated.

The measuring device according to the invention comprises a frame or supporting structure on which are mounted a damping device having a movable member constrained to motion in opposite directions and producing a damping effect proportional to its velocity, and a gyro rotor housing turnable about an axis substantially perpendicular to the rotor axis. To the housing is attached one end of a spring device the other end of which is attached to the movable member of the damping device. An output device, one element of which is connected with the rotor housing for movement therewith, provides output signals which are a function of the rotational disposition of the rotor housing relative to the fixed structure and which may be used for indication or for control purposes.

When thus arranged the gyro with its spring device measures the rate of turn about a reference axis perpendicular to the rotor axis and the rotational axis of the rotor housing.

If the characteristics of the damping device are such that it will create a damping force on its movable member proportional to the velocity of said member a time integral of rate of turn is obtained and indicated by the distance the damping device has moved. If the sensing of linear acceleration or velocity in a given direction with relation to the frame is desired this may be obtained by attaching a mass to the gyro housing and the movable member of the damping device respectively. This can be accomplished by a suitable construction of above mentioned components or of course by detachable weights.

With the above and other objects in view, which will appear as the description proceeds, this invention resides in the novel construction, combination and arrangment of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 2b is a sectional view taken on the plane of the line A—A in Figure 2a;

Figure 1:
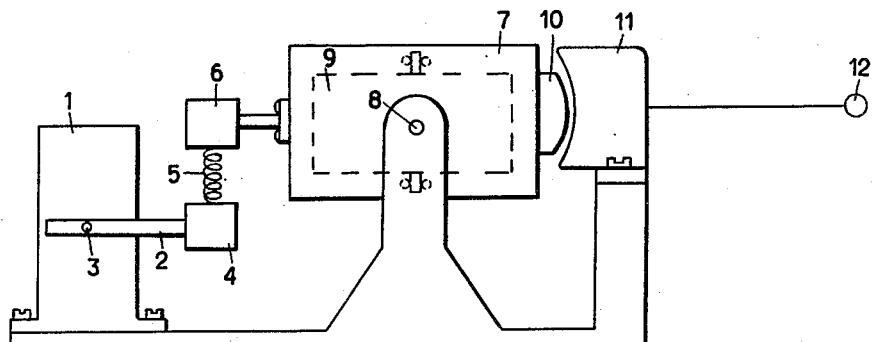
Figure 1 is a more or less diagrammatic elevational view of a device embodying the principles of this invention.

Referring now to the accompanying drawings, the reference numeral 80 designates generally a rigid frame or supporting structure adapted to be fixed in a vehicle, and upon which are mounted a gyro rotor housing 7 and the stationary element 1 of a damping device. The rotor housing 7 is freely rotatably mounted upon the supporting structure by means of a shaft 8 on the rotor housing, projecting in opposite directions therefrom, journaled in suitable bearings in the supporting structure, and a gyro rotor 9 is rotatably mounted in the rotor housing with its axis transverse to the axis of gyro rotor housing rotation. It will be understood that the supporting structure is mounted in the vehicle with the gyro rotor axis and the axis of rotor housing rotation both normal to the reference axis on the vehicle about which the instrument is intended to sense angular motion.

The damping device comprises generally a movable element constrained to motion in opposite directions, shown in Figure 1 as comprising an arm 2 mounted on a shaft 3, and a cooperating stationary element 1 fixed to the supporting structure. The gyro housing 7 has a resiliently yieldable motion transmitting connection with the movable element of the damping device, shown as comprising a coiled spring 5, which is adapted to flex in response to both tension and compression forces.

The output of the instrument is a function of the angular displacement of the gyro housing 7 about its rotational axis 8 relative to a predetermined disposition of the gyro housing with respect to the supporting structure. Output signals are produced by a movable output element 10 attached to the gyro housing 7 for motion therewith and a cooperating fixed output element 11 on the supporting structure.

In the embodiment of the invention shown in Figure 1 the spring 5 is shown connected at one end with a mass or weight 4 mounted on the arm 2 comprising a part of the movable element of the damping means and connected at its other end with a mass or weight 6 carried by the gyro housing. The mass or weight 6 on the gyro housing is so disposed with respect to the rotational axis of the housing as to dispose the center of gravity of the housing to one side of its rotational axis. It will be understood that the masses or weights 4 and 6 may be provided by integrally incorporating the necessary amount of weight into the arm 2 and gyro housing 4 respectively, or by separate readily removable weights attached to those members. It will also be understood that the axes of the shafts 3 and 8, about which the movable element of the damping member and the gyro housing respectively rotate, are disposed vertically so that the displacement of the center of gravity of these members about their rotational axes caused by the weights 4 and 6 will not interfere with operation of the device by causing those movable parts to rotate in response to such static forces thereon; and said movable parts must be substantially balanced statically about their rotational axes when their axes are disposed horizontally.

Figure 2A:
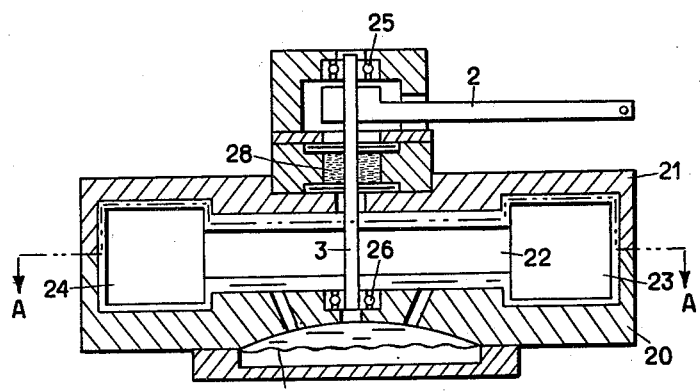
Figure 2a is a cross-sectional view of a damping device adapted for use with the apparatus of this invention.
Figure 2B:
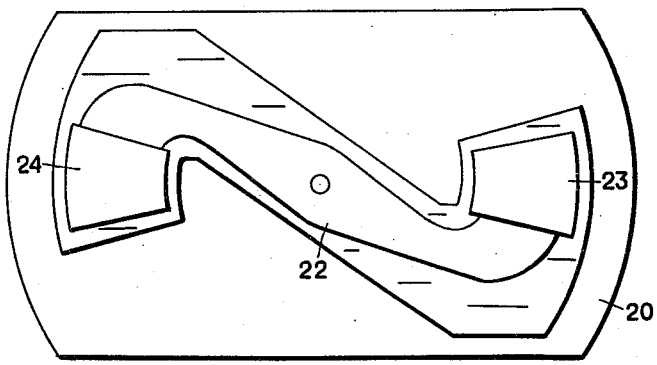
Figure 3:
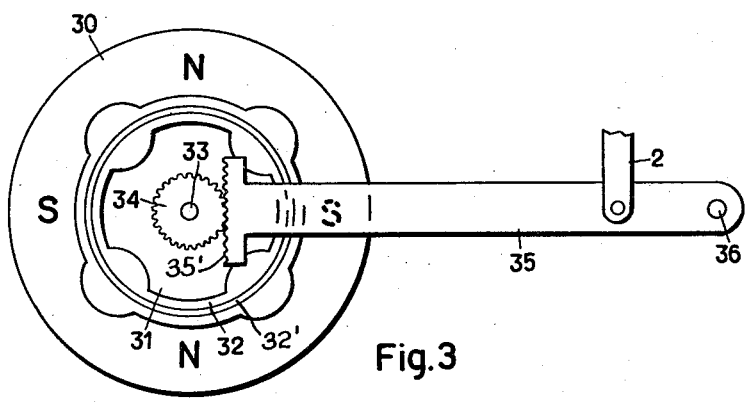
Figure 3 is an elevational view of another type of damping device suitable for use with the apparatus of this invention.

Two examples of damping devices 1 suitable for employment with the instrumentality of this invention are shown in Figs. 2a, 2b and 3. Figs. 2a and 2b show an embodiment, wherein the damping force is obtained as a consequence of the viscosity of a stream of liquid flowing through narrow slots between movable plungers and fixed cylinders in which said plungers move. Of course the movement of the plungers can be linear or orbital, which latter case is disclosed in the figure wherein the number of plungers is two, which number of course can be varied. The arm 2, the movement of which is to be dampingly resisted, is attached to the shaft 3, which is supported in bearings 25 and 26. On the same shaft an arm 22 is attached, the ends of which are shaped as plungers 23 and 24, which move in closely fitting arcuate grooves in fixed parts 20 and 21. The cavities in which the plungers 23 and 24 move are filled with liquid. In order to prevent the liquid from leaking out, the shaft 3 enters the housing through a stuffing box 28 which contains a suitable grease or other substance having a good cohesive capacity and which substance will not be dissolved by the damping liquid. To compensate for changes in the volume of liquid arising from variations in temperature there is a movable breathing diaphragm 27 at one side of the chamber portion 20.

Figure 2b is a section on the line A—A in Figure 2a, wherein the shape of the plungers and their grooves in part 20 is clearly illustrated. When the damping device is working the liquid is displaced from one side to the other of the plungers through the narrow slots provided by the clearance between the plungers and the surrounding walls. The force required to move the plungers is approximately proportional to the velocity of the plungers.

Fig. 3 shows another type of damping device, which works due to the damping effect of eddy currents. The device includes an annular permanent magnet 30, the field path of which is adapted to be closed by a cruciform piece 31 of soft iron coaxially fixed in the annular magnet and having the tips of its cross members spaced radially from the annular magnet 30 to cooperate therewith in defining an air gap. A metal drum 32 having an annular flange 32' in the air gap between the parts 30 and 31 is rotatably supported by shaft 33. The drum 32 is caused to rotate at a relatively high velocity in consequence of small movements of the arm 2 by means of a transmission comprising a pinion 34 fixed on the drum shaft 33 and an arcuate rack 35' intermeshing with the pinion 34 and carried by an arm 35 for swinging movement about a pivot 36 fixed on the supporting structure. The ratio of movement of the arm 2 to movement of drum 32' can be further increased by pivotally connecting arm 2 with rack arm 35 at a point on the latter which is substantially closer to its pivotal fulcrum 36 than to the rack 35'. As the arm 2 moves the metal drum 32 will move, and due to the eddy currents produced, a damping force proportional to the velocity of the arm 2 is obtained.

The embodiments described above are examples of damping devices, which operate in the way desired, namely, the damping force obtained is substantially proportional to the velocity of the output arm 2.

For the purpose of producing a deviation of the vehicle upon which the apparatus is mounted from the state of motion which would normally be maintained by the apparatus, forces may be imposed upon the movable parts (i. e., the gyro housing 7 and the movable element of the damping means) which modify the precessive and damping forces to which those parts are normally subjected, to thus modify the output of the instrumentality.

Figure 4:
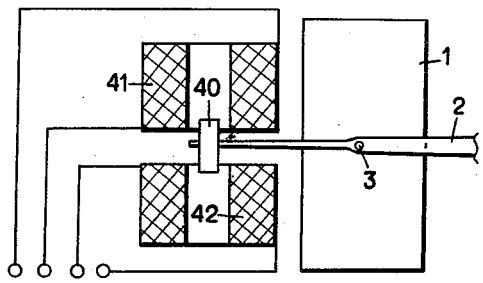
Figure 4 is a more or less diagrammatic view of an accessory device which may be employed in connection with apparatus of this invention.

As an example Fig. 4 shows an iron plunger 40 affixed to the arm 2 comprising part of the movable element of the damping means, which moves toward either of two solenoids 41 and 42 fixed at opposite sides of said arm. By variation of current in one or the other of the two coils the desired compensating force can be obtained. For example when the measuring device is mounted in an aeroplane as an autopilot for the purpose of directional stabilization and a predetermined turn of the plane is desired this will be obtained by energizing one or the other of the solenoids 41 or 42 depending upon the direction desired. Obviously the output from any other instrumentality, may be imposed upon the solenoids 41 and 42 to thus modify the output of the gyroscopic instrumentality.

Figure 5:
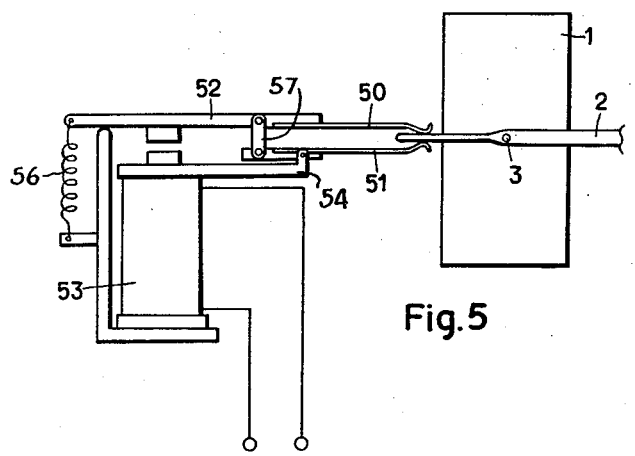
Figure 5 is a more or less diagrammatic view of another type of accessory device which may be used in connection with the instrument of this invention.

It is sometimes desirable to reset the device to a predetermined or zero position or to cause it to be biased to this zero position. For example this can be done by the arrangement shown in Fig. 5 in which the arm 2 is adapted to be yieldingly confined between two leaf-springs 50 and 51, one spring 51 being pivotally connected to a fixed arm on a coil 53 of an electro-magnet affixed to the supporting structure, while the other leaf spring 50 is connected to an armature 52, extending substantially parallel to said fixed arm 54 and pivoted for swinging movement, in response to energization of the magnet, toward said fixed arm. A tension spring 56 biases the armature away from the fixed arm, and a link 57 pivotally connected with the armature and the fixed arm provides for separation of the spring arms 50 and 51 by a substantial distance in response to bias of spring 56 when the magnet is deenergized.

When the electrical circuit is closed the armature 52, attached to the spring 50, will be drawn to the coil 53, whereby the arm carrying the armature 52 will move by means of the link so that the springs 50 and 51 are brought into engagement with opposite sides of arm 2 as shown in the figure. In opening the circuit the coil spring restores the leaf-springs 50 and 51 to their normal spaced position. If rigid arms are substituted for the springs 50 and 51, the device works for the purpose of caging, and if resilient spring arms are used a spring return device with a greater time constant is obtained. The caging device serves the same purpose as caging devices for, e. g. directional gyros. In using leaf-springs the spring return device is suitable for supervisory purposes, i. e., as a supplement to control in response to the output of another instrumentality, to prevent the hunting or oscillation which would otherwise occur if the output of such other device were alone imposed upon the control mechanism.

Figure 6:
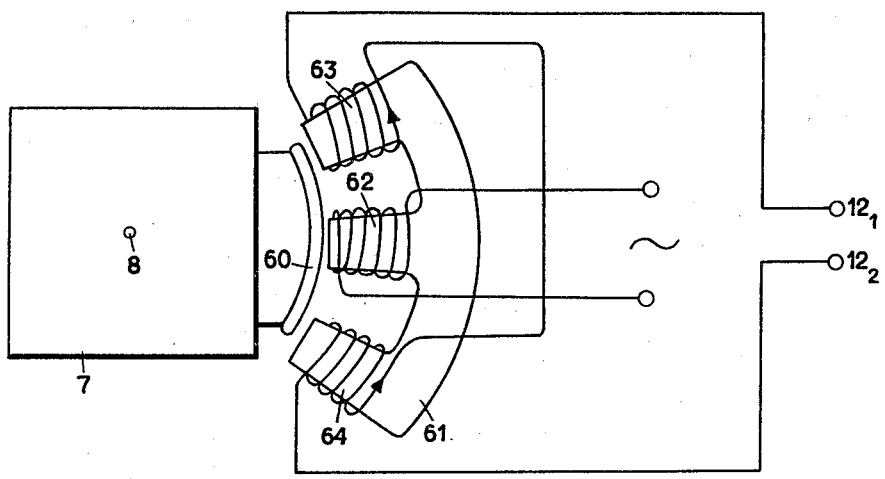
Figures 6 and 7 are diagrammatic views of two devices which may be employed for providing output signals indicative of the angular position of the rotor housing with respect to the frame.
Figure 7:
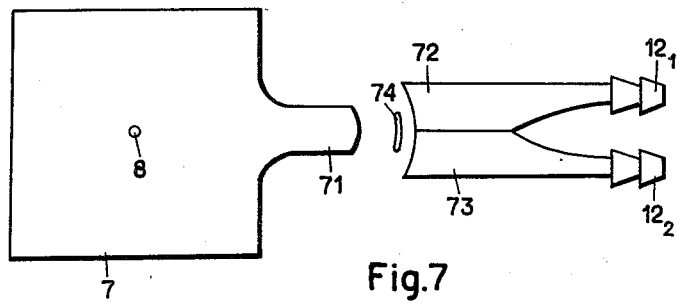

Figures 6 and 7 show two illustrative output producing means for providing a signal or output corresponding to the data sensed by the device and fed into it from other instrumentalities connected therewith, which output may be utilized in a control mechanism. Fixed to the rotor housing is an iron plate 60 which moves with the rotor housing in the magnetic field surrounding the E-core 61 shown in Fig. 6. An exciter coil 62 of E-core 61 is energized from an A. C. supply and A. C. voltages, which are modulated in amplitude and polarity depending on the position of the plate 60 in relation to coils 63 and 64 on the outer bifurcations of the E-core are induced in these latter coils and set up an output signal in $12_1$, and $12_2$. An output device employing electrical resistive or capacitive function can naturally be used.

Figure 7 shows a pneumatic output producing device, wherein air or gas is blown from a nozzle 71 on the housing 7 into two inlet nozzles 72 and 73. Depending on the position of nozzle 71 in relation to nozzles 72 and 73 a pressure difference is then built up in these receiving nozzles, which is taken as the output in two hose or tube connections $12_1$ and $12_2$. A shield 74 is arranged in front of the inlet openings of the nozzles 72 and 73. This shield may be fixed to the coil of an electrical moving coil instrument or some other measuring instrument and the position of the shield is then determined by the signal fed to the instrument. The shield 74 will partially obstruct the stream of gas from the nozzle 71 and when displaced to either side of a location centered between the two nozzles will vary the pressures in them independently of the pressure variation effected in consequence of displacement of the rotor housing and thereby produce a superimposed signal in the nozzles 72 and 73. This superimposed signal is consequently controlled by the signal brought to the instrument by which the shield is actuated.

The gas can be blown into the housing 7 through a hole in the shaft 8 by means of a coaxial nozzle having a smaller diameter aperture, which nozzle is spaced from the shaft 8, so that unnecessary friction in the transmission is avoided. The same gas is used for driving the gyro rotor.

The measuring device in Figure 1 operates in the following manner. When the supporting structure is turned about a reference axis, situated in the plane of the paper perpendicular to the rotor axis and to the axis of rotation of the gyro housing, the gyro housing will turn about the axis of its shaft 8. If the arm 2 were secured against motion relative to the supporting structure the spring 5 would then be stretched or compressed proportionally to the rate of angular velocity of the measuring device and with the same approximations as prevail in an ordinary rate-of-turn gyro. Further, the force on the spring is transmitted to the arm 2, which will move with a velocity proportional to the force imposed upon it by the spring. In this case, if the pure damping effect of the damping device 1 is made so great that the forces emanating from the gyro through the spring 5 only cause comparatively slight acceleration of the movable part of the damping device, the member 10 will be displaced in relation to the fixed member 11 of the position indicator.

This latter condition can be expressed by the following equation:

$$L_1 = k_1 \int P_1 \, dt$$

where $P$ = the force imposed on the spring
$k_1$ = an integration constant (damping constant)
$L_1$ = the displacement of the movable member in the damping device and as $$p_1 = \frac{k_2 d\varphi}{dt}$$

where $k_2$ = a constant, depending on the moment of inertia and number of revolutions of the gyro
$\varphi$ = the angular position of the measuring device about fixed axis (the "reference axis") relative to a predetermined reference position and thus $$\frac{d\varphi}{dt}$$

= rate of turn of the supporting structure about the reference axis it follows that $L_1 = k \times \varphi$, that is $L_1$ is proportional to the angular position of the measuring device about a fixed axis relative to a predetermined reference position.

The position of the output pick up at any instant will therefore be a function of the angular position and the rate of turn about the reference axis referred to. To simplify an understanding of the function of the device it will be presumed that the measuring device in Fig. 1 is installed in a position in which the axes of shafts 3 and 8 extend vertically, whereby the masses 4 and 6 do not cause any moment about these axes due to gravity. The mass 6 will then stretch or compress the spring 5 proportionally to the linear acceleration of the measuring device. The direction of the acceleration measured by the device in Fig. 1 is perpendicular to the arm 2 in the plane of the paper, and accordingly, the signal will be influenced by this linear acceleration.

The force on the spring 5 is transmitted to the arm 2, which in the same manner as previously described will give the equation:

$$L_2 = k_1 \cdot m_6 \int g \cdot dt$$

where $L_2$ = the displacement of the movable member in the damping device
$m_6$ = the mass 6
$g$ = the acceleration From the equation follows that the displacement $L_2$ is proportional to the velocity of the measuring device in the direction previously described. The mass 4 likewise actuates the arm 2 with a force which may be written $m_4 \cdot g$. The displacement thereof on the arm 2 is $$L_3 = k_1 \cdot m_4 \int g \cdot dt$$

where $L_3$ = the displacement of the movable member in the damping device.
$m_4$ = the mass 4

By adjusting the two weights 4 and 6 in relation to each other a suitable relation between the terms of velocity and acceleration is obtained. If no value of acceleration is desired the weight 6 is omitted. Obviously if no compensation for linear velocity is desired the weight 4 may also be omitted. When the weights 4 and 6 are employed, the output obtained from the output means 10 and 11 will be modified in accordance with functions of linear acceleration and velocity. By changing the constant of the spring device connecting the gyro housing and the damping device and by altering the weight on the gyro housing and/or the damping device the scales of the different measurements can be varied. In the same way these scales can be varied by using different damping constants in the damping device.

From the foregoing description taken together with the accompanying drawings it will be apparent that this invention provides a gyroscopic sensing instrumentality adapted to be mounted on a vehicle for sensing angular displacement and the rate of angular displacement of the vehicle about a reference axis, and which sensing device employs a single gyro for producing an output which is essentially the sum of a function of angular displacement and of a function of the rate of angular displacement. It will also be apparent that the output from the sensing instrumentality of this invention is in such form that it may be readily imposed upon a control actuating mechanism, especially since that output may be readily modified in accordance with the outputs of other instrumentalities and/or in accordance with variations in acceleration or velocity of translatory motion of the vehicle upon which the sensing instrumentality is mounted.

What I claim is:

1. A sensing device responsive to angular movement of a vehicle about a reference axis on the vehicle comprising: a rigid supporting structure fixable on a vehicle so as to partake of all motion of the vehicle; a gyro rotor housing; bearing means mounting said housing and constraining the housing to rotation about an axis fixed with respect to the supporting structure; a gyro rotor mounted in said housing for rotation about an axis perpendicular to said axis of rotation of the housing; damping means including a movable element constrained to motion in opposite directions and a stationary element fixed with respect to the supporting structure and cooperable with the movable element to effect a resistance to movement of the movable element in either direction, which resistance is proportional to the rate at which the movable element moves relative to the stationary element; a motion transmitting connection including a resiliently yieldable element connected between the gyro housing and said movable element of the damping means for imparting motion to said movable element in consequence of angular motion of the gyro housing about its axis of rotation; and output producing means including a first element mounted on the fixed structure and a second element constrained to move with the rotor housing, relative to said first element, and cooperable with said first element to produce an output which is a function of the angular disposition of the rotor housing with respect to the supporting structure, which disposition reflects the influence upon the gyro housing of the combined forces produced essentially by the precessing force of the gyro and the stress in the resiliently yieldable element resulting from the resistance produced by the damping means, so that said output comprises a function of the angular displacement of a vehicle on which the supporting structure is fixed about a reference axis on the vehicle with respect to a predetermined disposition of the vehicle, and of the velocity of such angular displacement.

2. The device of claim 1 further characterized by means for biasing the movable element of said damping means toward a predetermined position to thereby render the device substantially responsive only to rapid changes in the angular displacement of the vehicle about its reference axis.

3. The device of claim 2 further characterized by the provision of means for readily disabling said biasing means.

4. The device of claim 1 further characterized by the provision of a mass mounted for inertia-responsive motion relative to the supporting structure in opposite directions; and a motion transmitting connection between said mass and the movable element of the damping means for modifying the obtained output of the device substantially in proportion to a function of the velocity of translation of the device in said directions.

5. The device of claim 4 further characterized by means for biasing the movable element of said damping means toward a predetermined position to thereby render the device substantially responsive only to rapid changes in the angular displacement of the vehicle about its reference axis.

6. The device of claim 5 further characterized by the provison of means for readily disabling said biasing means.

7. The device of claim 1 further characterized by means for selectively biasing the movable element of the damping means toward one or the other of the limits of its motion to thereby effect a desired displacement of the angular disposition of a vehicle about its reference axis to a new disposition to be maintained by the device.

8. The device of claim 2 further characterized by output modifying means arranged to cooperate with the elements of said output producing means and connectible with the output from another instrumentality in which case its effect upon the produced output is a function of the output of such other instrumentality, so that when said output modifying means is operative at the time the movable element of the damping means is biased the final output of the device is primarily a function of the output of such other instrumentality, modified by a function of the short period responses of the device.

9. The device of claim 8 further characterized by the provision of means for readily disabling said means for biasing the movable element of the damping means.

References Cited in the file of this patent

UNITED STATES PATENTS

| | | |
|---|---|---|
| 1,590,977 | Henderson | June 29, 1926 |
| 1,597,788 | Henderson | Aug. 31, 1926 |
| 1,880,994 | Sperry | Oct. 4, 1932 |
| 1,900,709 | Henderson | Mar. 7, 1933 |
| 2,025,640 | Broulheit | Dec. 24, 1935 |
| 2,290,232 | Fischer | July 21, 1942 |
| 2,299,117 | Manteuffel | Oct. 20, 1942 |
| 2,365,439 | Schulze | Dec. 19, 1944 |
| 2,387,938 | Noxon | Oct. 30, 1945 |
| 2,552,722 | King | May 15, 1951 |